United States Patent [19]
Sakai et al.

[11] Patent Number: 5,272,544
[45] Date of Patent: Dec. 21, 1993

[54] DIGITAL/ANALOG CONVERTER AND IMAGE PROCESSING APPARATUS USING THE SAME

[75] Inventors: Masanori Sakai, Yokohama; Kazuhiko Hirooka, Tokyo; Masao Watanabe, Yokohama, all of Japan

[73] Assignee: Canon Kabushiki Kaisha, Tokyo, Japan

[21] Appl. No.: 704,201

[22] Filed: May 23, 1991

[30] Foreign Application Priority Data

May 29, 1990 [JP] Japan ............................ 2-137269
Sep. 26, 1990 [JP] Japan ............................ 2-254234

[51] Int. Cl.[5] .............................................. H04N 1/40
[52] U.S. Cl. .................................. 358/445; 358/447; 341/144
[58] Field of Search ............... 358/445, 447, 456, 298, 358/412, 409, 448, 455; 341/144, 152

[56] References Cited

U.S. PATENT DOCUMENTS

| | | | |
|---|---|---|---|
| 4,800,442 | 1/1989 | Riseman et al. | 358/280 |
| 4,811,037 | 3/1989 | Arai | 358/456 |
| 4,819,066 | 4/1989 | Miyagi | 358/456 |
| 4,864,305 | 9/1989 | Toyama | 341/152 |
| 4,868,684 | 9/1989 | Suzuki | 358/456 |
| 4,926,248 | 5/1990 | Kobayashi et al. | 358/75 |
| 4,926,268 | 5/1990 | Kawamura et al. | 358/458 |
| 5,029,227 | 7/1991 | Kawamura | 358/445 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image processing apparatus having: an unit for receiving a digital multi-value pixel data; a D/A converter for converting the inputted multi-value pixel data into an analog signal; a generator for generating an analog pattern signal synchronously with an input of the digital multi-value pixel data; a sample/hold circuit for sampling and holding the analog signal converted by the D/A converter, synchronously with an input of the digital multi-value pixel data; and a binarizing circuit for generating a binarized pulse signal having a width corresponding to the value of the digital multi-value pixel data by comparing the analog signal held the said sample/hold circuit with the pattern signal generated by the pattern signal generator. A D/A converter having: a digital/analog conversion unit for converting a digital signal into an analog signal at the same speed as the period of generating the digital signal; and a sample/hold circuit for holding and outputting the analog signal converted by the digital/analog conversion unit, synchronously with the period of generating the digital signal.

10 Claims, 9 Drawing Sheets

DIGITAL/ANALOG CONVERTER AND IMAGE PROCESSING APPARATUS USING THE SAME

BACKGROUND OF THE INVENTION

1. Field of the Invention

The present invention relates to a digital/analog (D/A) converter for converting a digital signal into an analog signal, and to an image processing apparatus for processing an image signal including a half tone image signal by using such a D/A converter.

2. Related Background Art

A dither method using a threshold value matrix, a dot pattern method, and the like are widely used for binarizing an image including a half tone image. However, such a conventional method is associated with a problem that binarization of an image, particularly a dot image, results in deterioration of an image quality because a large amount of moire patterns are generated by the space between dots and a threshold value matrix each having a periodical structure. Furthermore, not only a dot image but also a line image such as of a hand-written character has stepwise unevenness at its edge portion.

An image processing apparatus for solving such problems has been proposed as U.S. Pat. No. 4,926,248. This apparatus uses expensive circuit components such as digital comparators operating at a high speed and has a complicated structure. Other related arts include U.S. Pat. No. 4,800,442 and U.S. Pat. No. 4,926,268. According to these related arts, an image processing apparatus comprises input means for inputting a digital multi-value pixel data, D/A converter means for converting the inputted digital multi-value pixel data into an analog data, pattern signal generator means for generating a predetermined analog pattern signal, and binarizing means for generating a binary pulse signal (PWM signal) having a width corresponding to the value of the digital multi-value pixel data by comparing the analog signal converted by the D/A converter means with the pattern signal generated by the pattern signal generator means.

The shorter the time for establishing an analog output, the more a D/A converter becomes expensive. In order to precisely compare an analog output with an analog pattern signal, an analog signal should be established for a short time. Therefore, it is necessary to use a D/A converter which operates at a speed sufficiently faster than a clock signal for a digital signal, thereby resulting in a high cost.

Specifically, with most conventional D/A converters, the timing when an analog output signal is established is delayed by a certain time from the clock timing for a digital multi-value pixel data. Therefore, it is impossible to use the analog output signal synchronously with the digital input signal.

It is an object of the present invention to solve the above problems.

It is another object of the present invention to provide a D/A converter capable of highly precisely outputting an analog signal at the same clock timing for an input digital signal.

It is a further object of the present invention to provide an image processing apparatus capable of reproducing a high quality image.

The other objects, advantages and effects of the present invention will become more apparent from the following description when read in conjunction with the accompanying drawings.

DETAILED DESCRIPTION OF THE PREFERRED EMBODIMENTS

Preferred embodiments of the present invention will be described with reference to the accompanying drawings.

1st Embodiment

Figure 1:
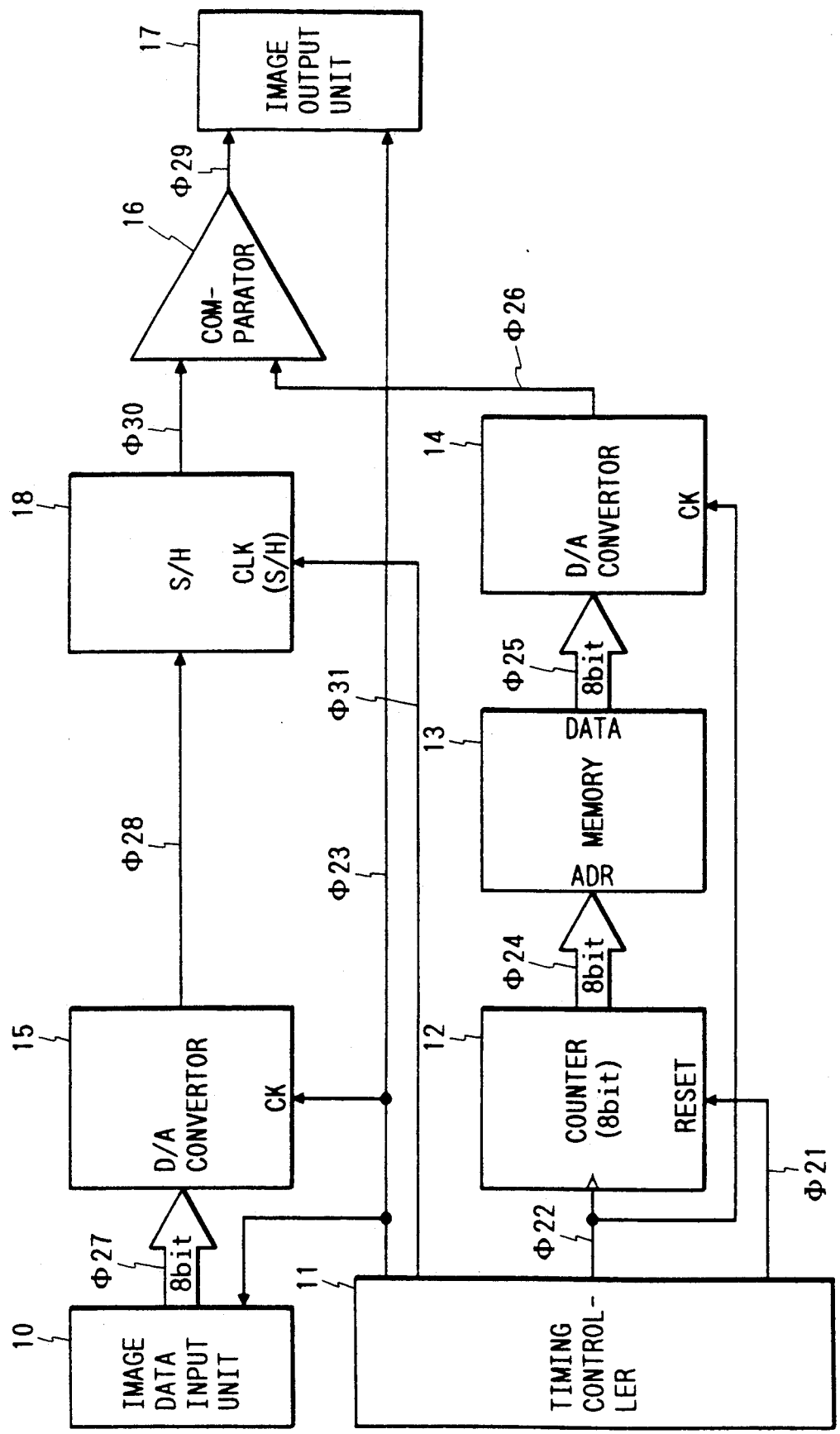
FIG. 1 is a block diagram showing an image processing apparatus according to an embodiment of the present invention.

FIG. 1 is a block diagram showing an image processing apparatus according to a first embodiment of the present invention.

In FIG. 1 reference numeral 10 represents an image data input unit for receiving a multi-value image data (8 bits per pixel), and reference numeral 11 represents a timing controller for outputting timing control signals ($\phi21$, 22, 23, 31, . . . ) to respective circuit elements. Reference numeral 12 represents counter for counting clocks $\phi22$ supplied by the timing control circuit, reference numeral 13 represents a memory functioning as a look-up table, reference numerals 14 and 15 represent a D/A converter for converting a digital data into an analog data, reference numeral 18 represents a sample/-hold circuit, reference numeral 16 represents a comparator for logically comparing the level of a signal $\phi30$ with that of a signal $\phi26$, and reference numeral 17 represents an image output unit for forming an image in accordance with a signal $\phi29$ outputted from the comparator 16. In this embodiment, the image output unit 17 uses a laser printer, and the signal $\phi29$ is used as a laser drive signal for driving a laser and applying a laser beam to a photosensitive drum and the like.

Figure 2:
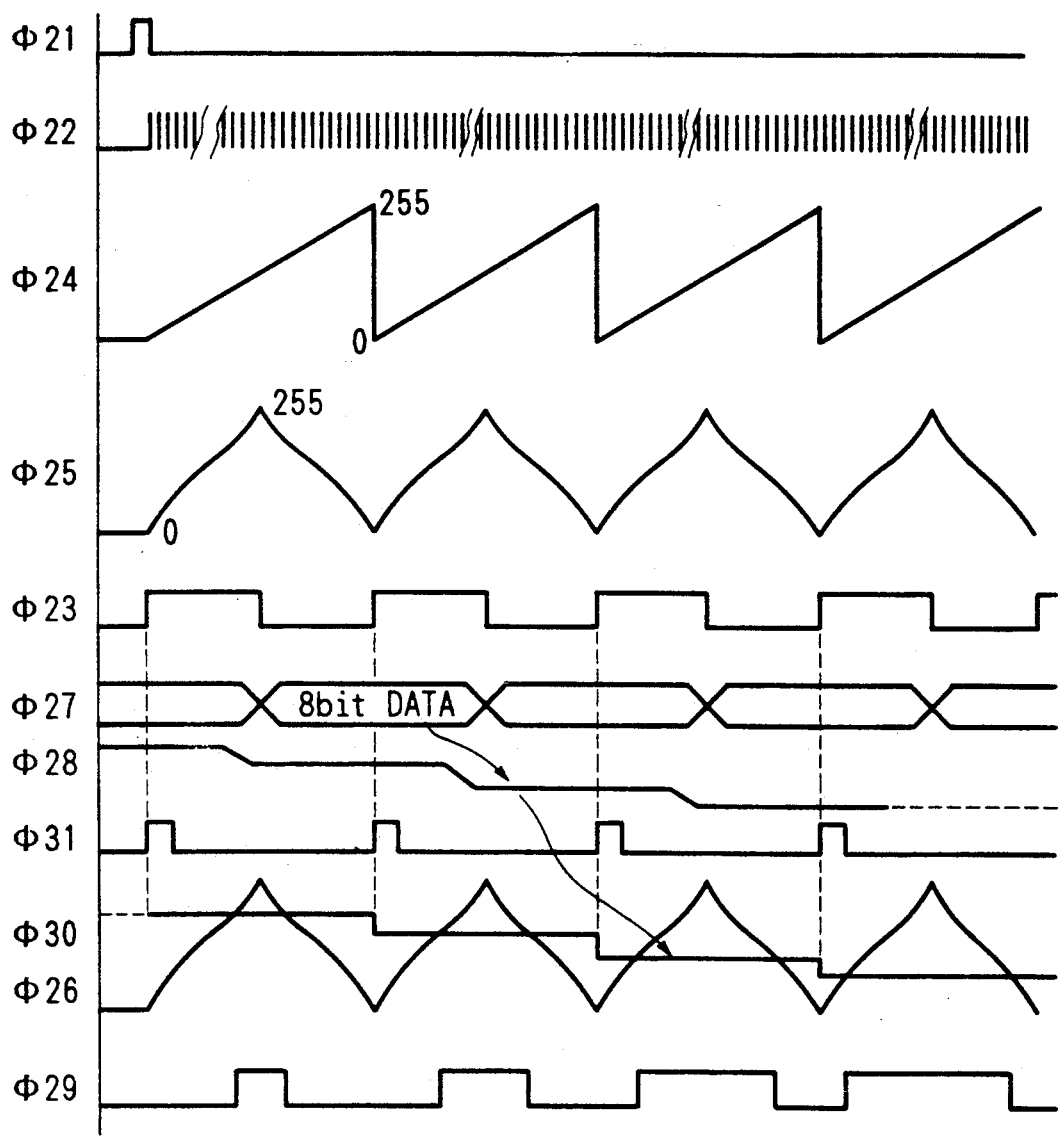
FIG. 2 is a timing chart used for explaining the operation of the apparatus shown in FIG. 1.

FIG. 2 is a timing chart used for explaining the operation of the respective circuit elements of the embodiment shown in FIG. 1. The operation of the embodiment will now be described with reference to this timing chart.

The image output unit 17 sends a beam detect (BD) signal (not indicated) to the timing controller 11 each time a laser beam starts scanning the photosensitive drum. Upon reception of this BD signal, the timing controller 11 outputs the signal $\phi21$ to the counter 12 to reset it to a count "0". Next, the counter 12 counts clocks φ22 supplied from the timing controller 11. The clock φ22 has a frequency 256 times as high as that of the screen clock φ23 (used as the operation timing signal for the image input unit 10 and D/A converter 15). The counter 12 sequentially outputs the count of clocks φ22 to the memory 13 in the form of 8 bit address data. The count sequentially increments its value from "0" to "255" each time one clock φ22 is supplied. The waveform of the count becomes a sawtooth if the count is plotted along the abscissa.

Figure 3:
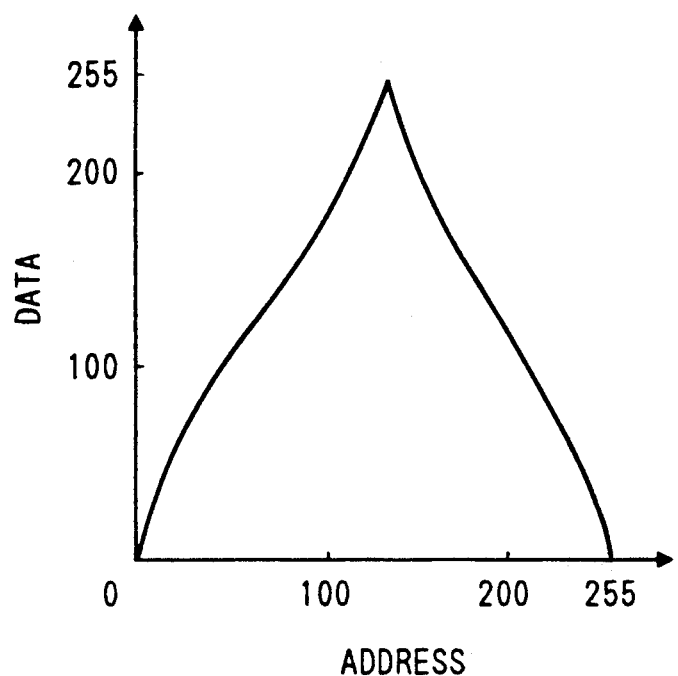
FIGS. 3 and 4 are graphs showing the conversion characteristic of a memory 13 between an input address and its output data.

In this embodiment, the conversion characteristic of the memory 13 between an input address and its output data is as shown in FIG. 3. Therefore, the waveform of the digital data read from the memory 13 becomes as represented by a signal φ25 as shown in FIG. 2 if the digital data is plotted along the coordinate and the time is plotted along the abscissa. This signal φ25 is converted by the D/A converter 14 into an analog signal φ26 shown in FIG. 2 which is then supplied to one input of the comparator 16.

In the meantime, an image data (8 bits) φ27 inputted to the image input unit 10 is supplied to the D/A converter 15 synchronously with the above-described screen clock φ23. In other words, the D/A converter 15 receives one pixel data synchronously with the count-up of the clocks φ22 from "0" to "255" by the counter 12. The D/A converter 15 converts the received image pixel data into an analog signal φ28 representative of the density of the pixel data. The analog image signal φ28 is supplied to the sample/hold circuit 30 which samples the analog image signal φ28 when a sample/hold signal φ31 from the timing controller 11 takes a high level "H (=1)" and holds it when the signal φ31 takes a low level "L (=0)".

The analog image signal φ30 from the sample/hold circuit 30 is applied to the other input of the comparator 16 and compared with the above-described analog signal φ26. The comparator 16 outputs a comparison result signal φ29 which takes the "H (=1)" level when the analog signal φ30 is larger than or equal to the analog signal φ26, and takes the "L (=0)" level when the former is smaller than the latter. It is to be noted that the multi-value image data (256 tonal levels) is converted into a binary pulse signal having a width corresponding to the density of the image data. The image output unit 17 receives the signal φ29 and generates a laser beam only when the signal φ29 takes the "H" level and applies the beam to the photosensitive drum to exposure it. As the laser beam scans the surface of the photosensitive drum, the sizes of formed pixels change with the widths corresponding to the image densities. It is therefore possible to form an image having a half tone.

The memory 13 may be either a ROM or a RAM. In the case of a RAM, if the contents thereof is changed, the analog signal φ26 can be produced having a desired one of various waveforms.

Figure 5:
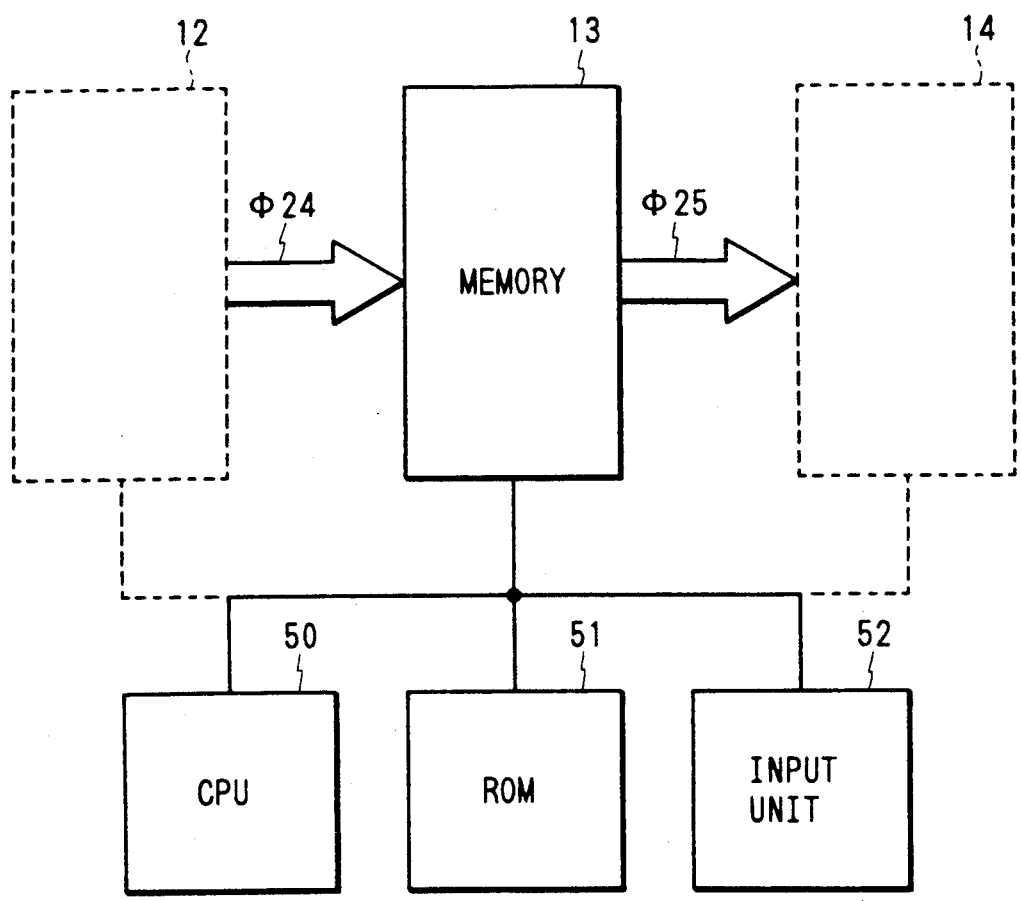
FIG. 5 is a block diagram showing the circuit for setting data to a memory 13.

FIG. 5 is a block diagram realizing the structure using a RAM as the memory 13.

Figure 6:
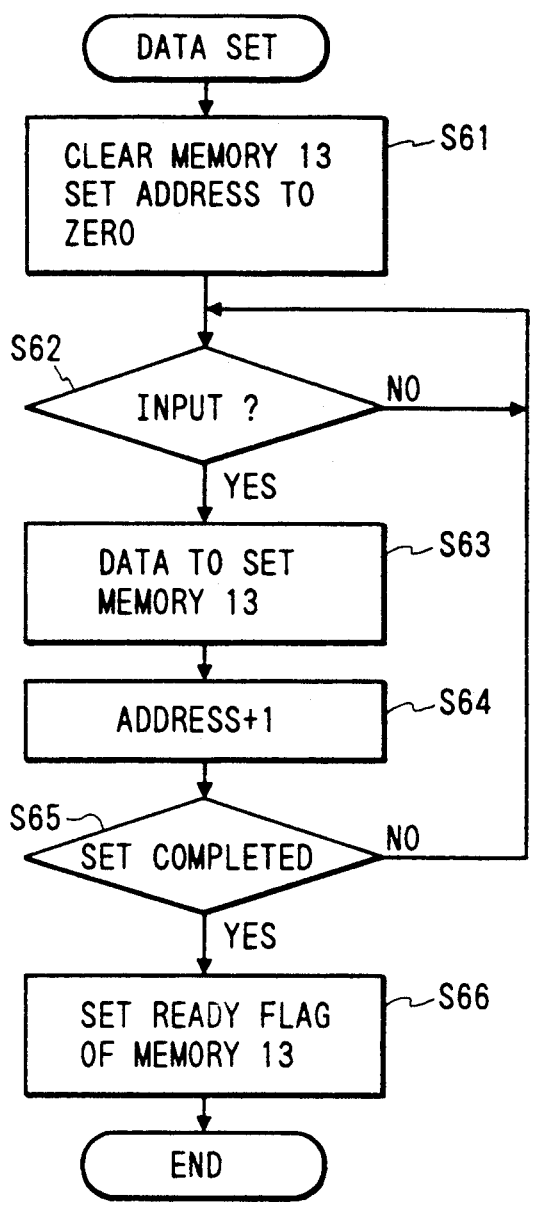
FIG. 6 is a flow chart illustrating the procedure of setting data to the memory shown in FIG. 5.

In FIG. 5, a CPU 50 operates in accordance with a program (illustrated by the flow chart of FIG. 6) stored in a ROM 51. The contents of the memory 13 are changed in accordance with an instruction entered from an input unit 52 such as a keyboard.

First, at step S61 the memory 13 is cleared, and the memory address is set to "0". Next, at step S62 a data input at the present address from the input unit 52 is waited. If it is judged that a data has been entered, the control advances to step S63 whereat the entered data is written in the memory 13 at the present address. At step S64, the address is incremented by 1 for writing the next data. At step S65 it is checked if all data has been set in the memory 13. If not, the control returns to step S62 to repeat the steps S62 to S65. If all data has been set, a ready flag for the memory 13 is set at step S66 to terminate the data write operation.

Figure 4:
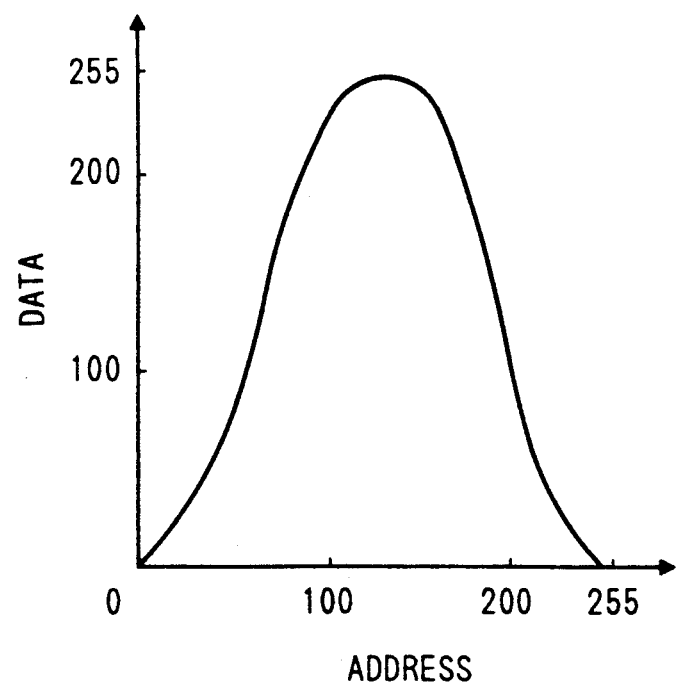

With the above processing, for example, the characteristic of the memory 13 shown in FIG. 3 may be changed to the characteristic shown in FIG. 4. Therefore, it is possible for an operator to freely change the tonal property of a halftone image as desired.

If CPU 50 is designed to read the memory 13 and control the counter 12 and D/A converter 14, the load of the main controller of the image processing apparatus can be reduced. Furthermore, although the output value φ24 from the counter 12 is used for indicating an address of the memory 13, another circuit allowing to set a desired address may be used so that various types of waveforms can be obtained using the same contents of the memory.

As described above, by converting an image signal including a halftone image signal into a binary pulse signal having a width corresponding to the image density, a reproduced image can be obtained which has a higher image quality than that obtained by a dither method using a threshold value matrix or by a dot pattern method. Furthermore, several screen functions may be preset in the memory 13 and may be selectively use them. In such a case, a gamma correction may be performed at the same time.

The sample/hold circuit is connected to the output of the D/A converter for converting a digital image signal into an analog signal, as in the above embodiment. Therefore, a D/A converter having a conversion speed like the transmission speed of a digital image signal can be used, resulting in an apparatus of low cost.

2nd Embodiment

Figure 7:
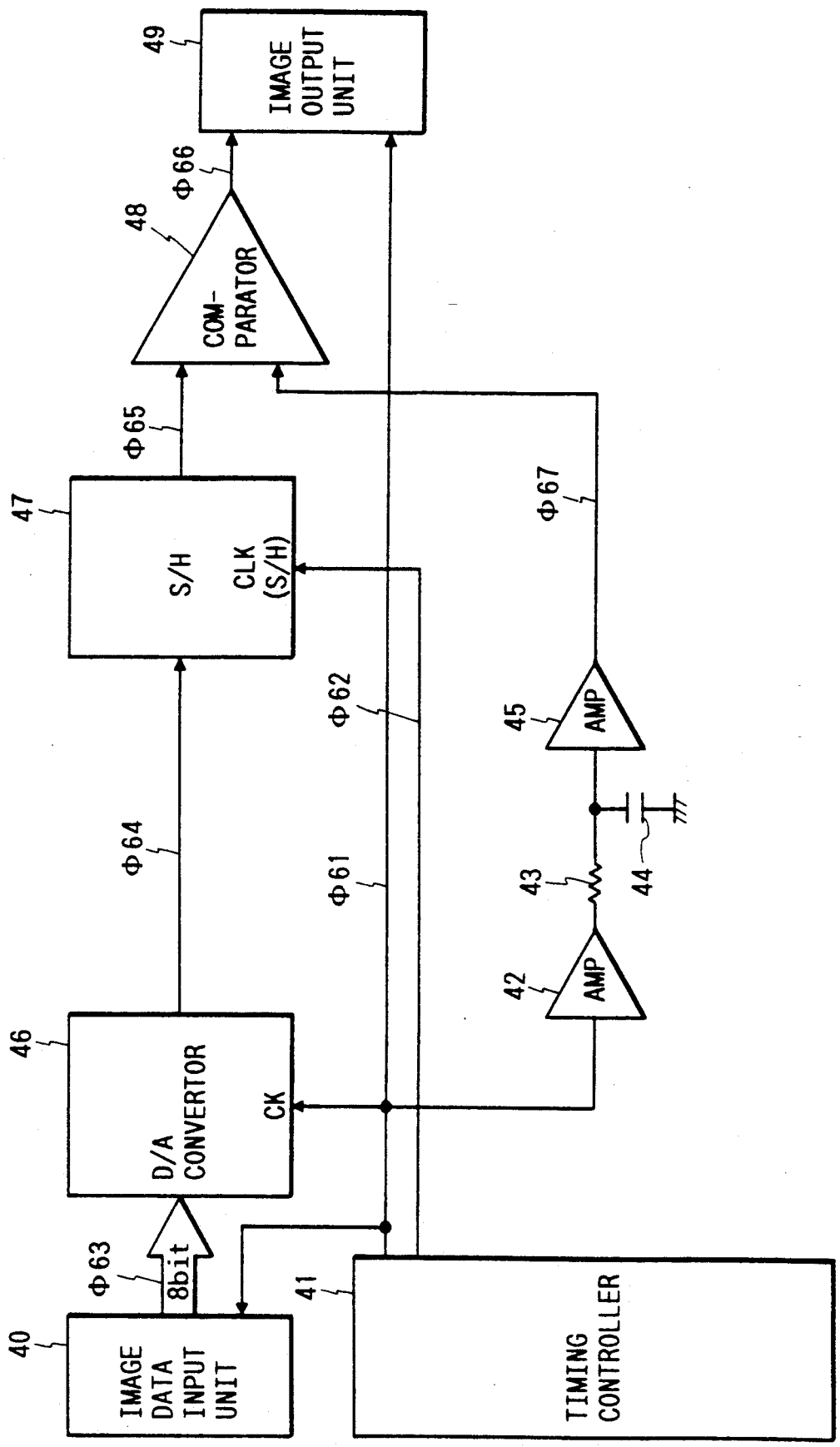
FIG. 7 is a block diagram of an image processing apparatus according to another embodiment of the present invention.
Figure 8:
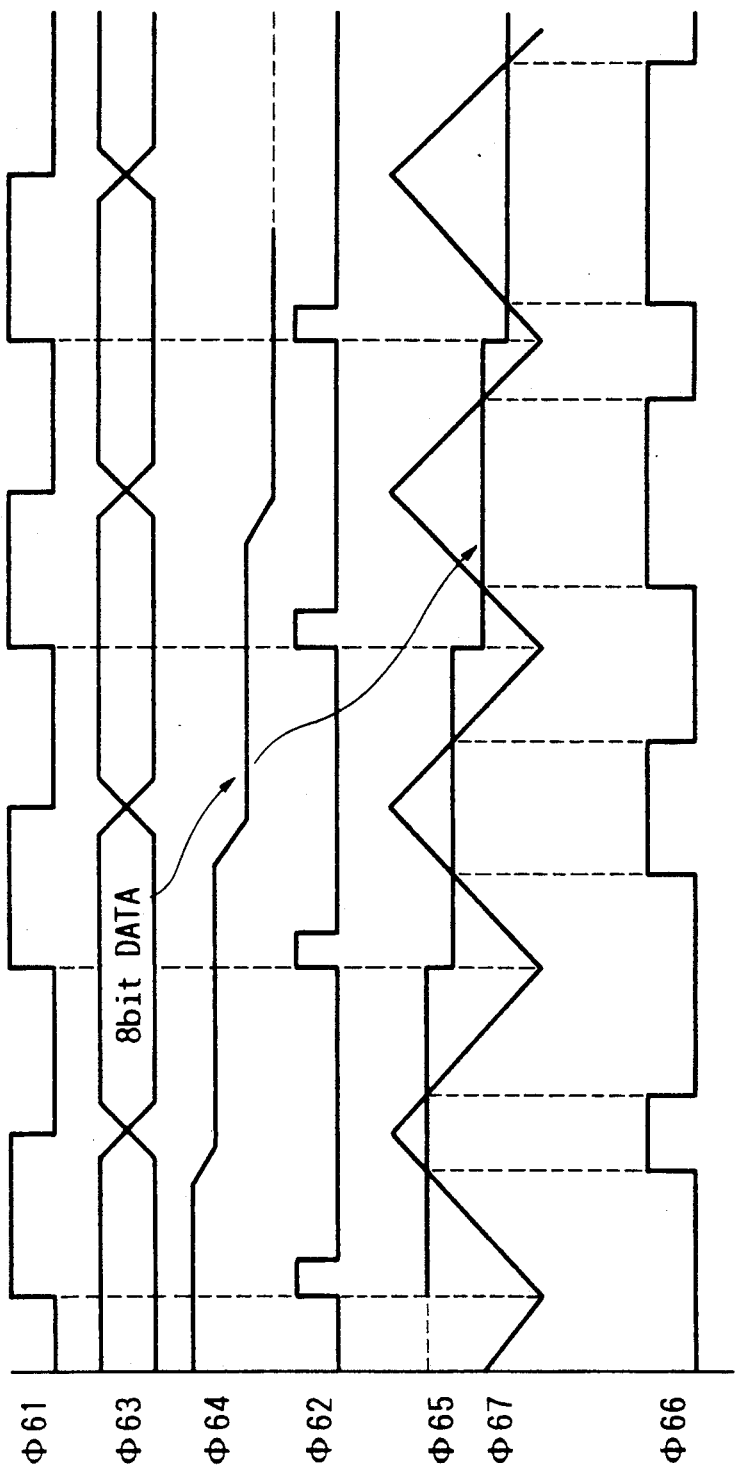
FIG. 8 is a timing chart used for explaining the operation of the apparatus shown in FIG. 7.

FIG. 7 is a block diagram of an image processing apparatus according to another embodiment of the present invention. FIG. 8 is a timing chart used for explaining the operation of the apparatus shown in FIG. 7. The second embodiment will be described with reference to FIGS. 7 and 8.

In FIG. 7, reference numeral 40 represents an image data input unit, reference numeral 41 represents a timing controller, reference numeral 42 represents an amplifier, reference numeral 43 represents a resistor, reference numeral 44 represents a capacitor, reference numeral 45 represents an amplifier, reference numeral 46 represents a D/A converter, and reference numeral 49 represents an image output unit.

A screen clock φ61 from the timing controller 41 is amplified by the amplifier 42 and applied to one end of the resistor 43. The resistor 43 and the capacitor 44 constitute an integration circuit so that a rectangle signal outputted from the amplifier 42 is integrated and transformed into a triangle signal. This triangle signal is amplified by the amplifier 45 and outputted as an analog screen signal φ67 which is then applied to one input of a comparator 48.

In the meantime, a digital image data φ63 inputted from the image input unit 40 or transmitted via a transmission means is converted into an analog image signal φ64 by the D/A converter 46, synchronously with the screen clock φ61 supplied from the timing controller 41. The analog signal is supplied to a sample/hold circuit 47 which samples the analog image signal φ64 when a sample/hold signal φ62 takes an "H" level, and holds it when the signal φ takes an "L" level. An analog image signal φ65 outputted from the sample/hold circuit 30 is applied to the other input of the comparator 48 which compares the analog image signal φ64 with the analog screen signal φ67 to obtain a binarized image data φ66 through pulse width modulation.

The binarized image signal φ66 is supplied to the image output unit 49 so that an image is formed on a drum by means of a laser driver (not shown). The details of this are omitted.

As described above, an image signal including a halftone image signal is binarized through pulse width modulation. Therefore, it is possible to obtain a reproduced image which has a higher image quality than that obtained by a dither method using a threshold value matrix or by a dot pattern method.

Furthermore, the sample/hold circuit is connected to the output of the D/A converter for converting a digital image signal into an analog signal. Therefore, a D/A converter having a conversion speed like the transmission speed of a digital image signal can be used, resulting in an apparatus of low cost.

As described so far, according to the present invention, even if a multi-value pixel data is received, it is possible to reproduce a high quality image.

Furthermore, there is provided a sample/hold means for sampling/holding an analog signal converted from a multi-value data. Therefore, the circuit for converting into an analog signal can be realized at low cost.

Still further, the waveform of a pattern may be changed as desired to obtain a properly reproduced image.

3rd Embodiment

The third embodiment of the present invention will be described in detail with reference to FIGS. 9 and 10.

Figure 9:
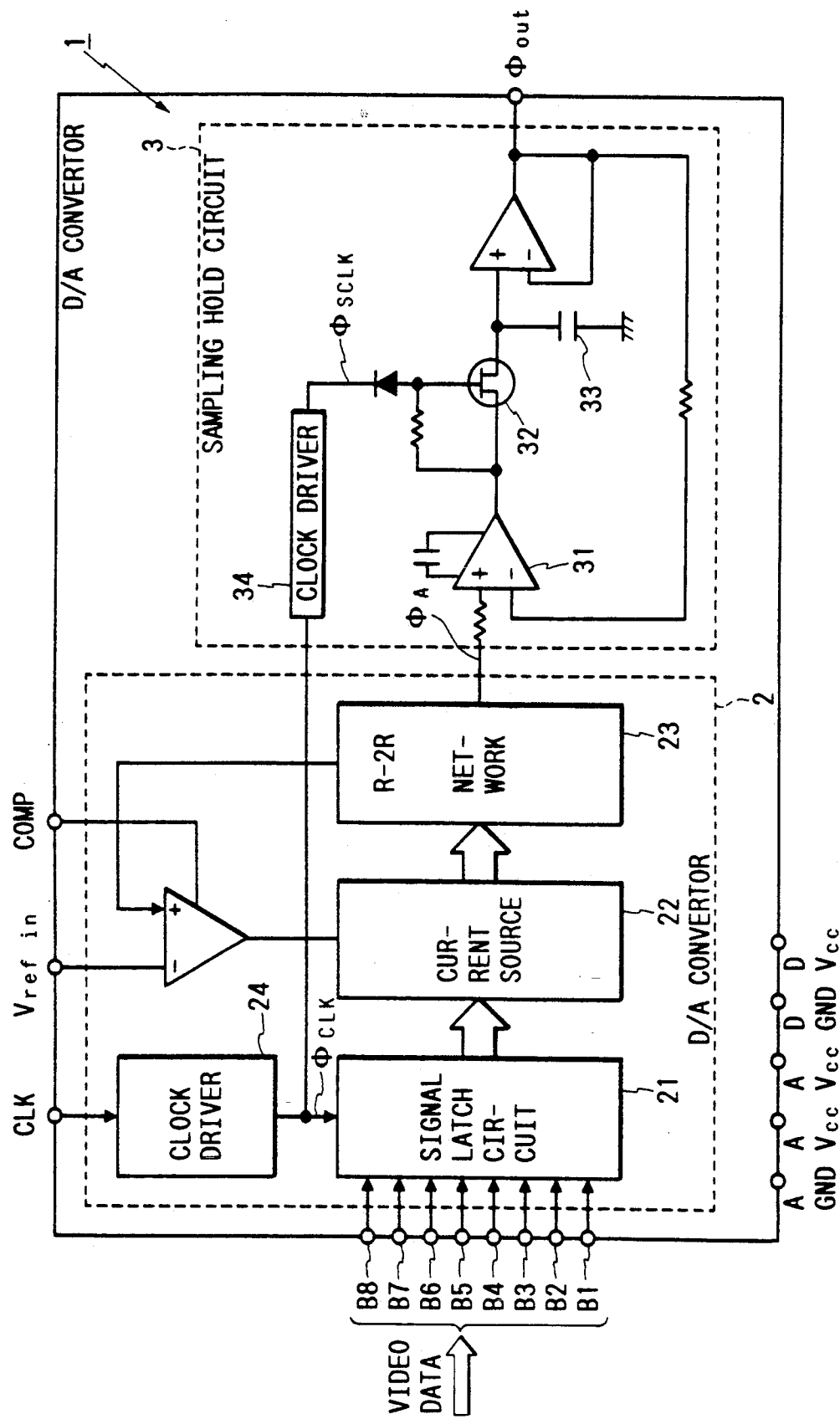
FIG. 9 is a block diagram showing the outline of a circuit arrangement according to a still further embodiment of the present invention.
Figure 10:
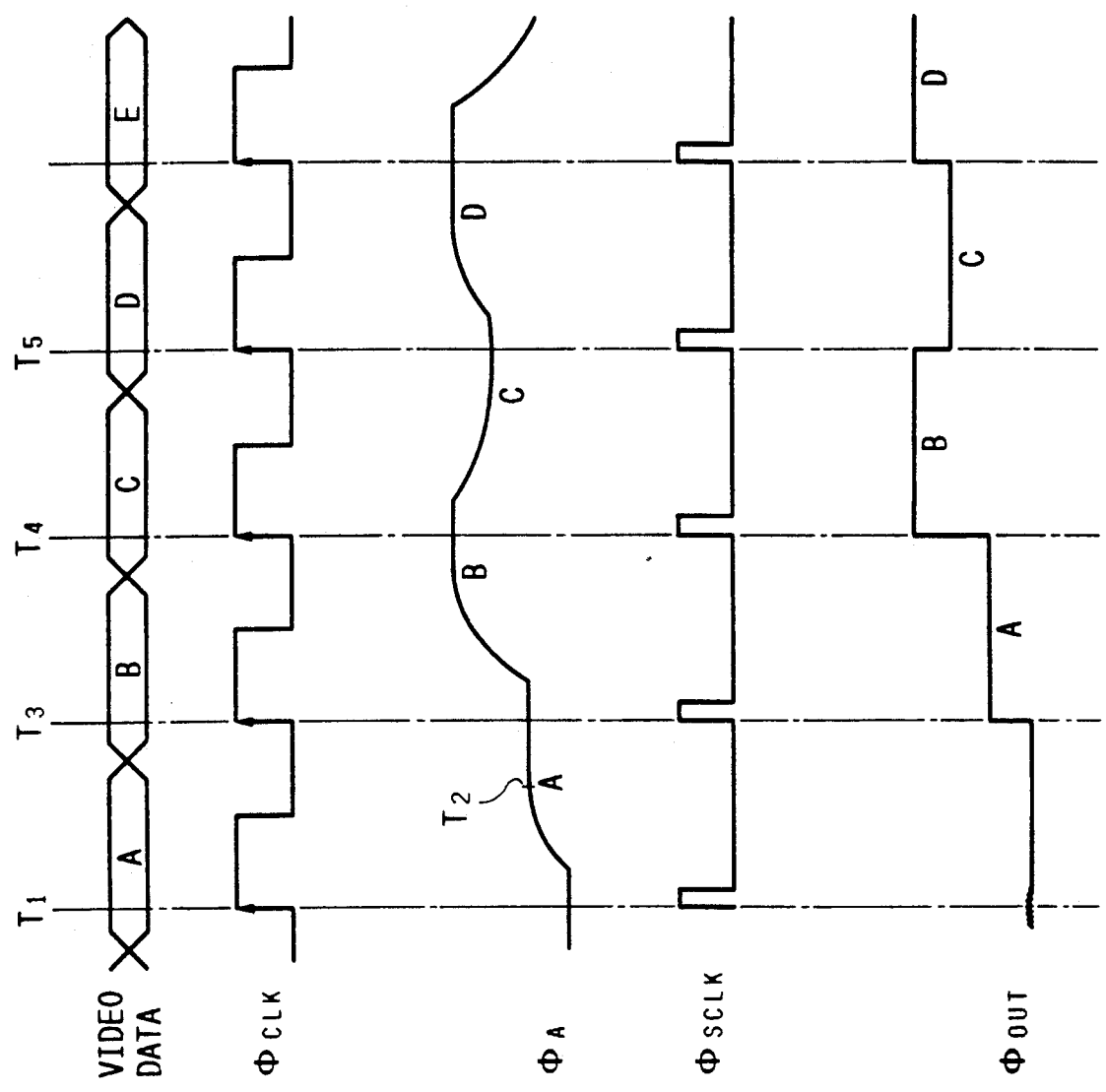
FIG. 10 is a timing chart showing signal generation timings for the circuit shown in FIG. 9.

FIG. 9 shows the outline of the structure of a D/A converter according to the third embodiment of the present invention. FIG. 10 shows the operation timings and signal waveforms at various circuit portions of the D/A converter shown in FIG. 9.

In FIG. 9, reference numeral 1 represents a D/A converter, and reference numeral 2 represents a D/A conversion unit of the D/A converter 1. Reference numeral 21 represents a latch circuit for latching an input digital signal.

Reference numeral 22 represents a current source having current switches, reference numeral 23 represents a R-2R resistor network, and reference numeral 24 represents a clock driver. The D/A conversion unit 2 may use one of conventionally used circuits, so the detailed description thereof is omitted.

In this embodiment, the D/A conversion unit 2 and a sample/hold circuit 3 are implemented on the same semiconductor substrate in a desired manner. The D/A conversion unit 2 and sample/hold circuit 3 are preferably used as the D/A converter 15, 46 and S/H 18, 47 in the first and second embodiments.

The sample/hold circuit 3 implemented within the D/A converter 1 is the main feature of the present invention. Reference numeral 31 represents an amplifier, and reference numeral 32 represents a sampling switch. Reference numeral 33 represents a potential holding capacitor, and reference numeral 34 represents a sampling clock driver used for generating a sampling clock φSCLK.

Next, the operation of the circuit shown in FIG. 9 will be described with reference to FIG. 10. An 8 bit digital video data inputted to terminals B1 to B8 shown in FIG. 9 is latched by the latch circuit 21 synchronously with a clock φCLK from the clock driver 24, the clock φCLK being obtained by amplifying a clock CLK which is in synchronism with the period of generating the digital video data (at timing T1 shown in FIG. 10).

An output of the latch circuit 21 is latched while each current switch in the current source 22 is selectively switched, and converted into an analog current signal.

An output of the current source 22 is applied to the R-2R resistor network and converted into an analog current φA corresponding to the input digital value. The analog current φA established at timing T2 is amplified by the amplifier 31 of the sample/hold circuit 3, and sampled at timing T3 by the sampling switch 32 which becomes conductive only when the sampling clock φSCLK generated from the clock φCLK takes an on-state.

The potential holding capacitor 33 is charged while the sampling switch 32 becomes conductive, and holds the analog voltage when the sampling switch is opened. While the sampling clock φSCLK takes an off-state, the voltage accumulated in the potential holding capacitor 33 is outputted. In the similar manner, a digital video signal is sequentially inputted to the D/A conversion unit 2, D/A converted, and outputted as an analog signal delayed by a certain time from the clock φCLK as shown in FIG. 10. The analog output of the amplifier 31 is sampled and held synchronously with the clock frequency of the sampling clock φCLK from the clock driver 34 so that an analog output φOUT delayed by one period can be sequentially obtained synchronously with the clock φCLK.

As the sampling clock φSCLK, the clock φCLK from the clock driver 24 may be directly used to set a smaller duty ratio for sampling.

As described so far, according to the present invention, an analog signal is outputted which delayed by one period from the period of generating a digital signal. Therefore, the analog signal can be used synchronously with the timing of generating the digital signal.

We claim:

1. An image processing apparatus comprising:
   input means for receiving digital multi-value pixel data;
   converting means for converting the inputted multi-value pixel data into an analog signal;
   means for generating an analog pattern signal synchronously with an input of the digital multi-value pixel data;
   sample/hold means for sampling and holding the analog signal converted by said converting means, synchronously with an input of the digital multi-value pixel data; and
   binarizing means for generating a binarized pulsed signal having a width corresponding to the value of the digital multi-value pixel data by comparing the analog signal held by said sample/hold means with the pattern signal generated by said pattern signal generating means wherein said converting means and said sample/hold means are implemented on a common semiconductor substrate.

2. An image processing apparatus according to claim 1, wherein said pattern signal generating means comprises:

clock generating means for generating a clock having a frequency N times as high as that of a clock which is used as a reference clock for an input of said digital multi-value pixel data;

means for counting the number of said clocks generated by said clock generating means;

a memory for storing a data whose value is related to an address where said data is stored; and second converting means for converting a data produced when the count from said counting means is supplied to said memory as said address, into said analog signal.

3. An image processing apparatus according to claim 2, wherein said data stored in said memory can be externally changed.

4. A digital/analog converter according to claim 1, wherein said input means inputs the digital multi-value pixel data in synchronism with a first pixel clock, and wherein said apparatus further comprises means for generating a signal for switching an operational condition of said sample/hold means on the basis of the first pixel clock.

5. A digital/analog converter according to claim 4, wherein said sample/hold means outputs the analog signal which is delayed by one period of the first pixel clock relative to the digital multi-value pixel data inputted by the input means.

6. A digital/analog converter comprising:

a digital signal input terminal for inputting a digital signal in synchronism with a first clock signal;

a digital/analog conversion unit for converting the digital signal inputted from said digital signal input terminal into an analog signal; and a sample/hold circuit for holding and outputting the analog signal converted by said digital/analog conversion unit, synchronously with a second clock signal having the same frequency as the frequency of the first clock signal;

wherein said digital/analog conversion unit and said sample/hold circuit are implemented on a common semiconductor substrate.

7. A digital/analog converter according to claim 6, further comprising:

a first clock signal input terminal for inputting the first clock signal; and second clock signal generating means for generating the second clock signal on the basis of the first clock signal inputted from said first clock signal input terminal.

8. A digital/analog converter according to claim 6, wherein said digital/analog conversion unit outputs an analog signal which is delayed by one period of the first clock signal relative to the inputted digital signal.

9. An image processing apparatus comprising:

input means for inputting digital multi-value pixel data in synchronism with a first pixel clock signal;

converting means for converting the inputted multi-value pixel data into an analog signal;

means for generating an analog pattern signal synchronously with the first pixel clock signal;

sample/hold means for sampling the analog signal converted by said converting means and holding the converted analog signal during substantially one period of the first pixel clock signal, said sample/hold means operating synchronously with a second pixel clock signal having the same frequency as a frequency of the first pixel clock signal; and binarizing means for generating a binarized pulse signal having a width corresponding to the value of the digital multi-value pixel data by comparing the analog signal held by said sample/hold means with the pattern signal generated by said pattern signal generating means.

10. An image processing apparatus according to claim 9, wherein said sample/hold means outputs an analog signal which is delayed by one period of the first clock signal relative to the digital multi-value pixel data inputted by the input means.

* * * * *